June 14, 1966  E. BOLELLI ET AL  3,256,375
METHOD OF PREPARING A COATED MOLDING FROM WOOD PARTICLES
Filed Feb. 7, 1962  3 Sheets-Sheet 1
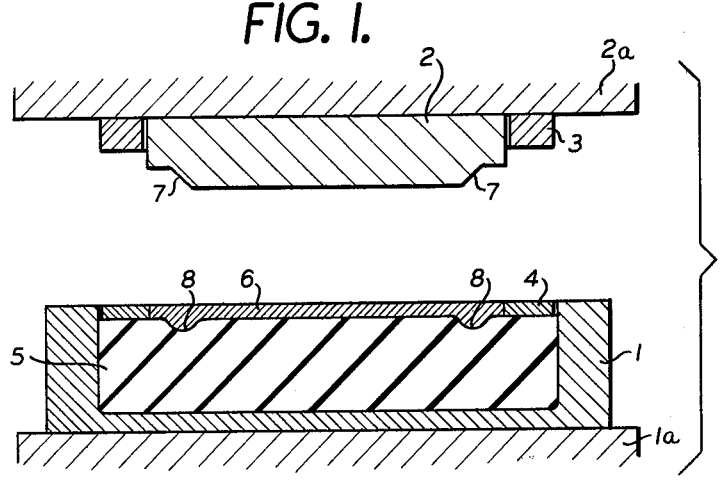
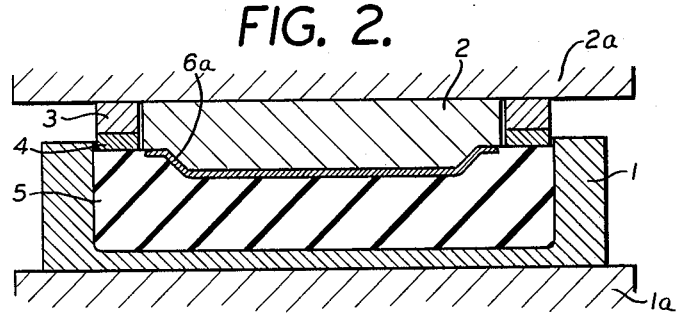
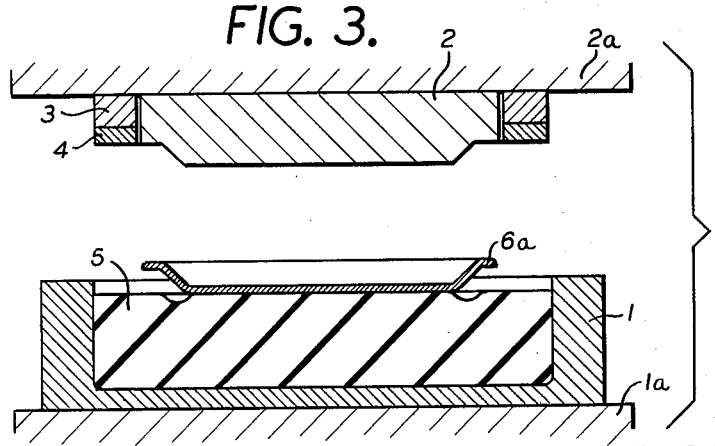
INVENTORS
EDMOND BOLELLI
LOUIS RODOLPHE MACH
BY
ATTORNEYS.

June 14, 1966 E. BOLELLI ET AL 3,256,375
METHOD OF PREPARING A COATED MOLDING FROM WOOD PARTICLES
Filed Feb. 7, 1962 3 Sheets-Sheet 2
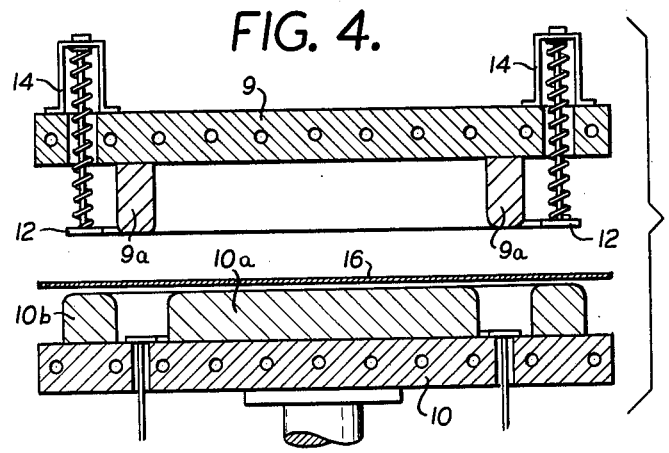
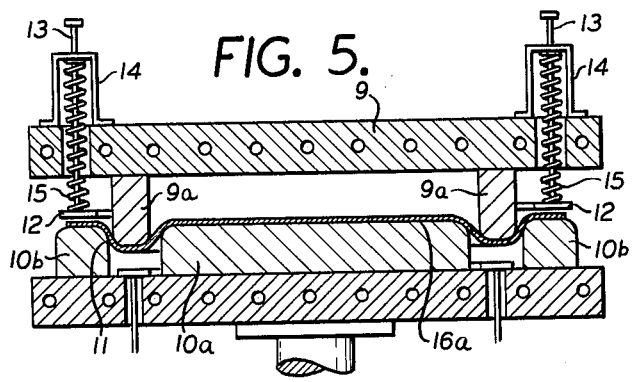
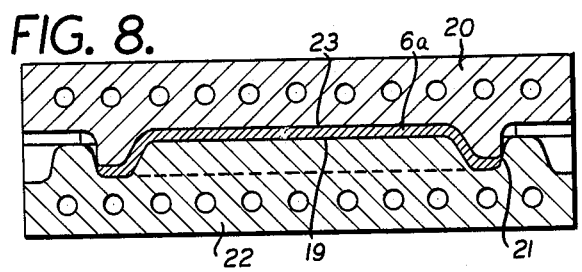
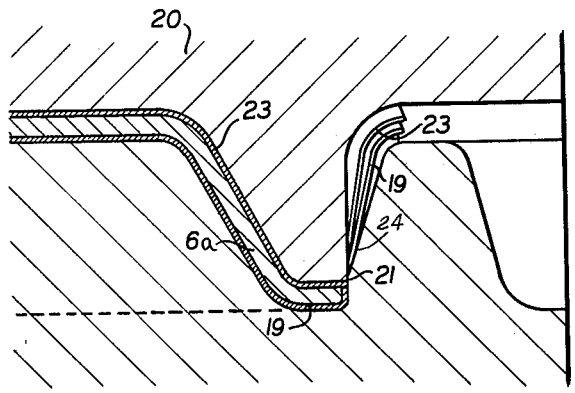
INVENTORS
EDMOND BOLELLI
LOUIS RODOLPHE MACH
BY
ATTORNEYS.

United States Patent Office 3,256,375
Patented June 14, 1966

3,256,375
METHOD OF PREPARING A COATED MOLDING FROM WOOD PARTICLES
Edmond Bolelli, Rennes, and Louis Rodolphe Mach, Ville d'Avray, France, assignors, by direct and mesne assignments, to Interessentskatet Thermodyn, Oslo, Norway, a French-Norwegian limited partnership
Filed Feb. 7, 1962, Ser. No. 171,678
7 Claims. (Cl. 264—112)

This invention relates to molding and aims to provide an improved method for preparing a coated molding from wood particles.

In the past, particles of wood containing polymerizable resinous material, e.g., sawdust, wood waste, wood shavings and the like, have been molded into articles possessing remarkable mechanical properties by subjecting such wood particles to high pressure in a hermetically sealed mold under high temperature whereby such wood particles have been compacted and the resinous materials have been polymerized. Attempts have been made to provide such molded articles with a protective coating, applied thereto during the molding operation, which would render unnecessary the subsequent application of lacquer or varnish and which would also impart a pleasing decorative effect to the molded articles. A very wide variety of materials has been proposed for use in such coating operations. The coating so applied might be chosen to improve the strength of the molded article; to modify its ability to conduct electricity or heat or sound; or to enhance its ability to adhere to another material. The substances from which such coatings have been formed have been of vegetable, mineral or synthetic origin and in the form of sheets, films, tissues, lattice or laminae, depending upon the primary purpose for which the coating was applied. Such coating substances have also been covered or impregnated with an appropriate binding agent such as a thermosetting resin of the urea or melamine type which would provide the best possible adhesion of the coating to the molding to which it was applied.

The protective coating referred to above has been applied to a premolded blank of wood particles compacted under conditions which did not affect polymerization of resinous material contained therein; or such a coating has been applied to a molding which had been treated so as to cause polymerization of resinous material contained therein and a second similar treatment was accorded thereto after application of the coating material. Both of these coating methods, as practiced in the past, have been subject to serious disadvantages.

In the case of two successive molding operations, one performed before and the other performed after the application of the coating, but both effected in a tight mold and at comparatively high temperatures, the coating exhibited poor adherence to the molded article as the binding agent employed to provide such adherence could not penetrate below the surface of the molded article whose body consisted of a compact agglomerate which had been transformed chemically, as well as physically, to include polymerized resinous material.

In the process where the coating was applied to an object which had been subjected to a premolding operation at low temperature, improved adherence of the coating to the molding was obtained, particularly when the coating was made from a sheet containing or consisting of a material such as melamine paper or a tissue coated with a polyester. However, practical considerations rendered this process unavailable because it is essential in a finished coated molding that there be no air pockets between the coating and the base to which it is applied. Accordingly, it is necessary that the premolded object to which the coating is applied conform to very precise specifications and be of uniform density. Furthermore, since the molded objects to which this invention is addressed are generally characterized by light weight but good mechanical strength, it is important that the thickness thereof be adequate in nonreinforced areas. Premolded forms meeting these requirements could not be satisfactorily produced by compacting wood particles between the two parts of conventional metal molds.

Another disadvantage that has attended the preparation of coated moldings in the past has arisen from the fact that it is often necessary to coat the upper and lower parts of the article separately. However, it is important that the edges of these two coatings join perfectly for when they overlap by varying amounts from one article to another random areas of excess thickness are formed which not only detract from the appearance of the articles but also interfere with their interchangeability.

Another disadvantage has attended the use, as a coating material, of a decorative sheet such as paper covered with melamine. In attempting to apply such a sheet to an object having an irregular surface the strains to which it is subjected during the molding process cause the sheet to become torn or ruptured resulting in serious impairment of the appearance of the finished product.

We have discovered that it is possible to overcome all of the foregoing disadvantages in the manufacture of coated moldings from wood particles. This can be accomplished by virtue of our invention through a three-step process. In the first step, wood particles containing polymerizable resinous material are subjected to pressure in a mold to provide a compacted blank corresponding in form to the finished molding. In the second step, a sheet of special paper is shaped to conform with a face of the blank prepared in the first step. The special paper that we use in the practice of the second step is a crepe paper that is impregnated with a thermosetting binder such as melamine. Such crepe paper may consist of a single ply with the plaits or crimpings all running in the same direction or with one set of plaits or crimpings running in one direction and a second set of plaits or crimpings running in a direction perpendicular thereto; or it may consist of two plies, each provided with plaits or crimpings wherein the plaits or crimpings of one ply are disposed perpendicularly to the plaits or crimpings of the other ply. In the third step of our process, the shaped sheet of crepe paper is placed upon the face of the premolded blank with which it conforms and this assembly is sealed under pressure in a metal mold to which heat is supplied so that the resinous material is polymerized.

The first step of our new process, which involves precision molding, can be conveniently practiced in a special pressure mold that we have invented and which includes a rigid die and a support therefor. A flexible matrix which is adapted to receive and be temporarily deformed by the rigid die when they are forced together is mounted in a metal shell and means are provided for forcing the die and matrix toward each other and then withdrawing them from each other. An annulus is mounted on the support for the die so that it surrounds a portion of that die and a complementary annulus which is adapted to be seated on the matrix to provide the side walls for a layer of uncompacted wood particles constitutes, with the first-mentioned annulus, a stop limiting the movement of the die and matrix toward each other. Means are also provided for withdrawing the complementary annulus from the matrix with the die when the die and matrix are separated from each other.

Apparatus for carrying out our invention in the manufacture of a plate is illustrated schematically, by way of example, in the accompanying drawings wherein:

FIG. 1 is a sectional elevation of our new pressure mold which is used in carrying out the first step of our process, showing the die and matrix separated from each other and with the matrix carrying a layer of uncompacted wood particles;

FIG. 2 is a sectional elevation of the mold illustrated in FIG. 1 showing the compacting of the wood particles;

FIG. 3 is a sectional elevation of the mold illustrated in FIG. 2 with the parts thereof separated from each other after the premolding of the plate blank has been completed;

FIG. 4 is a sectional elevation of shaping apparatus used in the second step of our method in the position which they occupy prior to the shaping operation;

FIG. 5 is a sectional elevation of shaping apparatus illustrated in FIG. 4 with the parts thereof in shaping position;

FIG. 6b is a side view of the unshaped sheet used to prepare the shaped sheet illustrated in FIGS. 6 and 6a;

FIG. 7b is a side view of the unshaped sheet used to prepare the shaped sheet illustrated in FIGS. 7 and 7a;

FIG. 8 is a sectional elevation of a closed mold used in the practice of the third step of our process; and FIG. 9 is an enlarged view of the righthand side of FIG. 8.

Figure 7:
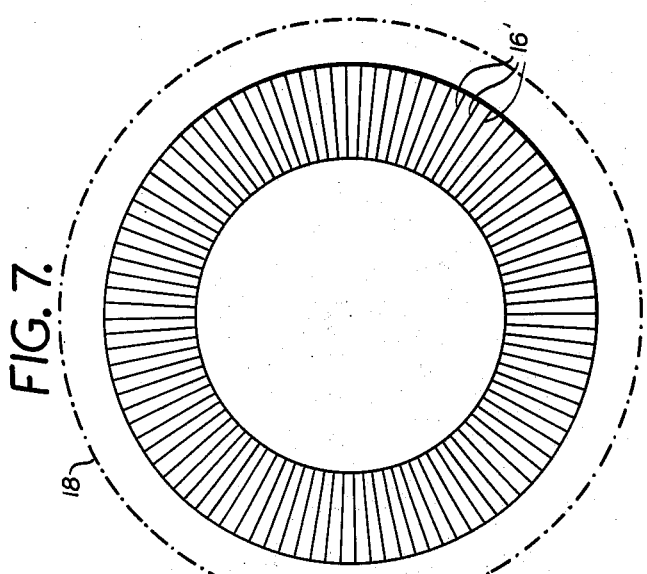
FIG. 7 is a plan view of a coating shaped from a sheet of uncreped paper.

The pressure mold illustrated in FIG. 1 includes a metal shell 1 mounted upon a movable support 1a and a rigid die 2 carried by the fixed support 2a. A flexible matrix 5 is mounted in the shell 1. A metal annulus 3 is carried by the support 2a so that it surrounds the upper portion of the rigid die 2 and a complementary metal annulus 4 which is seated on the face of matrix 5 provides the side walls for a layer 6 of uncompacted wood particles. The face of the rigid die 2, which is contoured to form a plate blank, includes an inclined portion 7 and, in order that the premolded blank 6a illustrated in FIGS. 2 and 3 shall be of uniform thickness, the flexible matrix 5 is recessed at 8 to accommodate the additional quantity of wood particles required to insure uniform thickness of the blank 6a along the inclined portions 7 of die 2.

The support 1a is provided with means (not shown) for forcing the matrix 5 upward toward the support 2a so that the wood particles 6 are compacted between the face of rigid die 2 and flexible matrix 5 as illustrated in FIG. 2. Such premolding operation is conducted at room temperature for a period ranging from about 15 to about 30 seconds and at a pressure ranging from about 100 to about 150 kilograms per square centimeter.

It will be noted that when the matrix is forced upward as illustrated in FIG. 2, the annulus 3 and the annulus 4 together constitute a stop which limits the upward movement of matrix 5. When the matrix 5 is moved downward away from die 2, the annulus 4 is withdrawn from that matrix. This can be done by making the annuli of a ferrous alloy so that the annulus 3 can be magnetized to attract the annulus 4; or by giving the outer wall of die 2 a tapered shape so that annulus 4 is wedged thereon when the matrix 5 is forced upward. After the matrix 5 is lowered from die 2, the elastic matrix 5 springs back to its normal position as illustrated in FIG. 3, and the blank 6a is readily removed therefrom.

After the blank 6a is removed from matrix 5, the upper and lower faces are coated with the shaped crepe paper that we employ in the practice of our invention. The paper we prefer to use for this purpose is creped in two directions which are perpendicular with respect to each other and it is of a special quality. It is very different from the ordinary crimped paper used for packing and which consists of "kraft" sodium carbonate paper or paper impregnated with latex. Instead, it has a high cellulose content, is heavily impregnated (through the use of a minimum of 20% titanium dioxide or a minimum of 30% zinc sulfide), and is of comparatively high weight, preferably between 165 and 175 grams per square meter. In order that it will provide a tight coating for the premolded blank 6a, it has a high dry strength of the order of 9 kilograms, a high wet strength in the range of 2.5 to 3 kilograms, and its relative resistance when wet is preferably between 24 and 25%. Also, it has a shear strength ranging between 1.64 and 2.05 kilogram-meters per centimeter in the longitudinal direction, and between 1.84 and 2.15 kilogram-meters per centimeter in the transverse direction, with a rupture strength between 2.83 and 2.93 kilograms per square centimeter.

The crepe paper to be shaped is given a pre-treatment through which it is impregnated with a resinous binding agent, preferably melamine. This is done by drawing the paper in known manner through a bath of the binding material so that it absorbs substantially its own weight of the material forming the bath, and thereafter drying the impregnated paper to the point where it is no longer tacky and its moisture content ranges between 4 and 8%. The paper may also include coloring material whose properties are such that it will not run or bleed, or be adversely affected by the heat applied during the final molding operation. The apparatus in which such a sheet is shaped includes an upper mold holder 9 and a lower mold 10. The upper mold holder 9 carries a boss 9a which is adapted to fit into groove 11 between the center piece 10a and circular flange 10b carried by the lower mold 10. A ring 12 is carried by plungers 13 mounted in brackets 14 and is resiliently urged to the position illustrated in FIG. 4 through the action of the coil springs 15. To insure against the binder-impregnated sheet of crepe paper sticking to the shaping mold, we prefer that it be made of steel with a polished, chromeplated surface which may, if desired, be coated with a lubricant such as polytetrafluoroethylene.

Figure 7A:
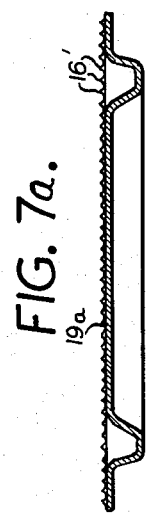
FIG. 7a is a section along the diameter of FIG. 7.
Figure 7B:
Figure 6:
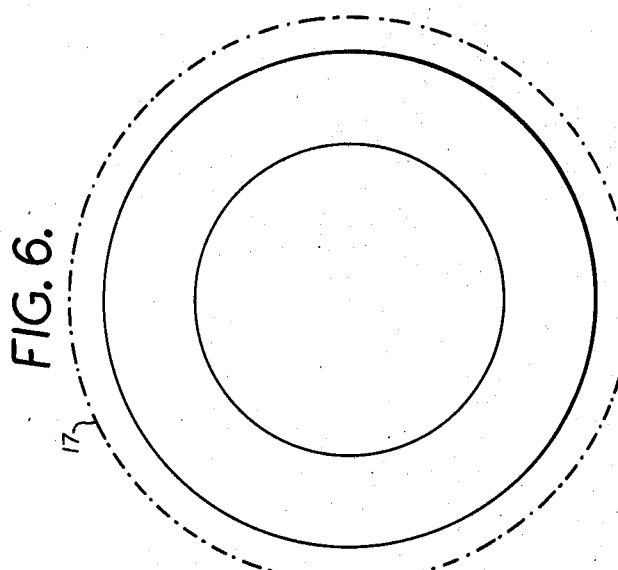
FIG. 6 is a plan view of a coating shaped pursuant to our invention for the bottom of the plate base illustrated in FIG. 2.
Figure 6A:
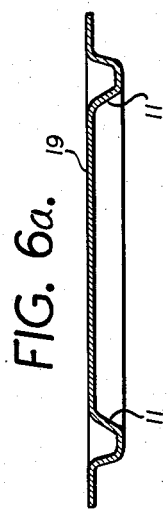
FIG. 6a is a section along the diameter of the shaped coating sheet illustrated in FIG. 6.
Figure 6B:

The operation of the shaping apparatus illustrated in FIGS. 4 and 5 is as follows: A sheet 16 of crepe paper that has been impregnated with a binder is placed on lower mold 10 and it and upper mold holder 9 are drawn together so that the boss 9a enters groove 11. The paper 16 is held in place between mold 10 and mold holder 9 during the shaping operation through the action of spring-pressed ring 12 and the paper used to coat a face of the premolded blank 6a is given the profile exhibited by sheet 16a through elongation and without any tearing of such paper. This is made possible by virtue of the fact that crepe paper is used. The shaping operation does not entail the application of much pressure and may be carried out in about 30 seconds. Preferably the paper is subjected to the influence of heat (preferably between 70 and 120° C.) during the shaping operation. Such operation converts a flat sheet 17 into a shaped sheet 19 (see FIGS. 6–6b, inc.). It will be noted that the shaped sheet 19 is free from the tears 16' which occur in the sheet 19a, illustrated in FIGS. 7 and 7a, which was similarly shaped by like treatment of the uncreped sheet 18 illustrated in FIG. 7b. It will be noted further upon comparing the flat sheet 17 (FIG. 6b) with the flat sheet 18 (FIG. 7b) that, when the coating is shaped from crepe paper, a sheet of smaller diameter may be employed.

In the manufacture of an article of complex shape, such as the dish as illustrated in the drawing, shaped sheets of crepe paper are prepared for the coating. One such sheet 19 is fitted over one of the faces of the blank 6a and another such sheet 23 is fitted over the opposite face of that blank, whose moisture content is adjusted to between 7 and 12% (preferably 10%). This assembly is then placed between the upper mold member 20 and the lower mold member 22 illustrated in FIGS. 8 and 9. The lower mold member 22 is provided with a wall 24 which flares outwardly from the perpendicular through an angle of about 3° to 7°. The upper mold member 20 is provided with a sharp edge 21 which wedges against the conical wall 24 of the lower mold 21 so that the portions of blanks 19 and 23 which extend beyond the outer rim of the molded article 6a are cleanly and uniformly severed therefrom as best illustrated in FIG. 9. The wedging of sharp edge 21 against wall 24 then forms a tight seal for the mold. Such a seal is very important since a tightly closed mold is essential to the polymerization of resinous material which is effected in the third step of our process, and the play between the upper and lower molds is preferably limited to between 25 and 30 microns. The sealed mold is then heated so that the resinous material in the article 6a is polymerized, after which the finished coated molded article is cooled and removed from the mold.

The coated moldings that are produced through the practice of our invention are characterized by the fact that the coating thereon is free from ruptures and, since the binding agent can penetrate below the surface of the base before polymerization of the resinous material contained in that base is effected, close adherence of the coating to the base is assured. Furthermore, where more than one sheet of material is used for the coating, the meeting edges are trimmed flush without any overlapping so that moldings of unusual uniformity in size and appearance are produced.

The terms that we have used in describing the embodiment of our invention that is illustrated by the foregoing specific example are terms of description and not of limitation and it will be appreciated that various changes may be made in the embodiment that we have described without departing from the spirit of our invention as it is defined in the appended claims.

What is claimed is:

1. The method of making a coated molding of curved contour from wood particles containing polymerizable resinous material which comprises:
   subjecting said particles to pressure in a first mold to prepare a compacted blank of curved contour corresponding in form to the finished molding;
   shaping a sheet of crepe paper impregnated with a resinous binder to conform in contour with a face of said blank;
   placing the blank in a second mold with the shaped sheet of crepe paper covering said face of the blank;
   closing and sealing said second mold; and
   heating said sealed mold to polymerize the resinous material in said blank.

2. The method of making a coated molding of curved contour from wood particles containing polymerizable resinous material which comprises:
   subjecting said particles to high pressure between a rigid die of curved contour and a flexible matrix to prepare a compacted blank of curved contour corresponding in form to the finished molding;
   shaping a sheet of crepe paper impregnated with a resinous binder to conform in contour with a face of said blank;
   placing the blank in a mold with the shaped sheet of crepe paper covering said face of the blank;
   closing and sealing said second mold; and
   heating said sealed mold to polymerize the resinous material in said blank.

3. The method of making a coated molding of curved contour from wood particles containing polymerizable resinous material which comprises:
   subjecting said particles to high pressure between a a rigid die of curved contour and a flexible matrix adapted to be temporarily deformed by said die so that the surface of said matrix assumes a profile corresponding to the profile of said die to prepare a compacted blank of curved contour corresponding in form to the finished molding;
   shaping a sheet of crepe paper impregnated with a resinous binder to conform in contour with a face of said blank;
   placing the blank in a mold with the shaped sheet of crepe paper covering said face of the blank;
   closing and sealing said second mold; and
   heating said sealed mold to polymerize the resinous material in said blank.

4. The method of making a coated molding of curved contour from wood particles containing polymerizable resinous material which comprises:
   subjecting said particles to pressure in a first mold to prepare a compacted blank of curved contour corresponding in form to the finished molding;
   shaping paper impregnated with a resinous binder and creped in two perpendicular directions to conform in contour with a face of said blank;
   placing the blank in a second mold with the shaped sheet of crepe paper covering said face of the blank;
   closing and sealing said second mold; and
   heating said sealed mold to polymerize the resinous material in said blank.

5. The method of making a coated molding of curved contour from wood particles containing polymerizable resinous material which comprises:
   subjecting said particles to pressure in a first mold to prepare a compacted blank of curved contour corresponding in form to the finished molding;
   impregnating crepe paper with a binding agent and shaping said impregnated crepe paper to conform in contour with a face of said blank;
   placing the blank in a second mold with the shaped sheet of crepe paper covering said face of the blank;
   closing and sealing said second mold; and
   heating said sealed mold to polymerize the resinous material in said blank.

6. The method of making a coated molding of curved contour from wood particles containing polymerizable resinous material which comprises:
   subjecting said particles to pressure in a first mold to prepare a compacted blank of curved contour corresponding in form to the finished molding;
   shaping a sheet of crepe paper impregnated with a resinous binder so that it is provided with a profile which corresponds in contour with the profile of said blank and has edges extending beyond the edges of said blank;
   placing the blank, with the shaped sheet fitted over said face, in a second mold;
   closing said second mold so that it is sealed and, simultaneously therewith, the said sheet is trimmed to the dimensions of said blank; and
   heating said sealed mold to polymerize the resinous material in said blank.

7. The method of making a coated molding of curved contour from wood particles containing polymerizable resinous material which comprises:
   subjecting said particles to pressure in a first mold to prepare a compacted blank of curved contour corresponding in form to the finished molding;
   shaping sheets of crepe paper impregnated with a resinous binder to conform in contour respectively, with the faces of said blank so that their meeting edges overlap;
   placing the blank in a second mold with the shaped sheets fitted upon the faces of the blank with which they respectively conform;
   closing said mold so that it trims the overlapping portions of the shaped sheets therefrom and simultaneously seals said mold; and
   heating said sealed mold to polymerize the resinous material in said blank.

(References on following page)

References Cited by the Examiner

UNITED STATES PATENTS

| | | | |
|---|---|---|---|
| 203,670 | 5/1878 | Stevens | 18—35 |
| 208,097 | 9/1878 | House | 18—35 |
| 2,100,891 | 11/1937 | Zinser | 264—287 |
| 2,257,429 | 9/1941 | Ruegenberg | 264—287 |
| 2,450,448 | 10/1948 | Sawyer | 18—47.5 |
| 2,646,380 | 7/1953 | Barlow et al. | 264—135 |
| 2,851,730 | 9/1958 | Wilhelmi et al. | 264—120 |
| 2,854,372 | 9/1958 | Yan et al. | 264—109 |
| 3,021,244 | 2/1962 | Meiler | 264—120 |
| 3,021,565 | 2/1962 | Bowman | 18—47.5 |

FOREIGN PATENTS 523,009   3/1956   Canada.

OTHER REFERENCES

"Continuous Structural Board From Sawdust," in Modern Plastics, September 1947, pages 89–91.

ROBERT F. WHITE, *Primary Examiner.*

WILLIAM J. STEPHENSON, ALFRED L. LEAVITT, ALEXANDER H. BRODMERKEL, *Examiners.*

C. N. SHANE, J. R. HALL, *Assistant Examiners.*